(12) United States Patent
Lakshmikanthan et al.

(10) Patent No.: US 9,665,147 B1
(45) Date of Patent: May 30, 2017

(54) DEVICES AND METHODS FOR MINIMIZING INPUT CAPACITANCE IN COMPUTER DESIGN

(71) Applicant: GOOGLE INC., Mountain View, CA (US)

(72) Inventors: Srikanth Lakshmikanthan, Milpitas, CA (US); Christopher Lyon, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 121 days.

(21) Appl. No.: 14/564,680

(22) Filed: Dec. 9, 2014

Related U.S. Application Data (60) Provisional application No. 61/915,166, filed on Dec. 12, 2013.

(51) Int. Cl.
*H02M 3/04* (2006.01)
*H02M 3/158* (2006.01)
*G06F 1/26* (2006.01)

(52) U.S. Cl.
CPC ............ *G06F 1/26* (2013.01); *H02M 3/1584* (2013.01); *H02M 3/1588* (2013.01); *Y02B 70/1466* (2013.01)

(58) Field of Classification Search
CPC ..... G06F 1/26; H02M 3/1588; H02M 3/1584; Y02B 70/1466
See application file for complete search history.

(56) References Cited

U.S. PATENT DOCUMENTS

| | | | | |
|---|---|---|---|---|
| 6,448,746 B1* | 9/2002 | Carlson | ............... | H02M 3/1584 323/272 |
| 7,368,959 B1* | 5/2008 | Xu | ....... | H02M 3/1584 327/141 |
| 8,014,181 B2* | 9/2011 | Tan | .......... | H02M 7/48 327/156 |
| 8,120,203 B2* | 2/2012 | Heineman | ................ | H02J 1/08 307/32 |
| 8,351,265 B2* | 1/2013 | Pyeon | ..................... | G11O 5/145 365/185.18 |
| 2004/0192190 A1* | 9/2004 | Motoyama | ................ | H03F 1/02 455/3.02 |
| 2008/0048625 A1* | 2/2008 | Chapuis | .................. | H02J 1/102 323/234 |
| 2011/0234331 A1* | 9/2011 | Ding | .................... | H03B 5/1212 331/36 C |

\* cited by examiner

*Primary Examiner* — M Elamin
(74) *Attorney, Agent, or Firm* — Brake Hughes Bellermann LLP (57) ABSTRACT

In some implementations, a computing device may include a plurality of voltage regulators including a first voltage regulator and a second voltage regulator, and a multi-phase oscillator, connected to the first voltage regulator and the second voltage regulator, configured to synchronize the first voltage regulator and the second voltage regulator.

19 Claims, 4 Drawing Sheets

DEVICES AND METHODS FOR MINIMIZING INPUT CAPACITANCE IN COMPUTER DESIGN

CROSS-REFERENCE TO RELATED APPLICATION

This application is a Nonprovisional of, and claims priority to, U.S. Patent Application No. 61/915,166, filed Dec. 12, 2013, entitled "DEVICES AND METHODS FOR MINIMIZING INPUT CAPACITANCE IN COMPUTER DESIGN", which is incorporated by reference herein in its entirety.

BACKGROUND

In a traditional laptop or computer design, a computing device may include a relatively large number of independent voltage regulators. These voltage regulators may be used to convert a voltage level to one or more different voltage levels. In a generic example, a voltage regulator may be used to convert a voltage level of 12 volts to 5 volts, 3.3 volts, and/or 1 volt for use within various subsystems within the computing device. Traditionally, these voltage regulators may operate asynchronously from each other, e.g., they can pull current at any point in time. Generally, voltage regulators utilized in computing devices operate as switching regulators where they receive relatively high input voltage and rapidly switch the input voltage on and off on a periodic cycle having an operating frequency, which, as a result, filters the input voltage into a lower output voltage.

For a variety of different reasons, the asynchronous voltage regulators may include voltage regulators operating at a number of different frequencies. For example, some voltage regulators may operate at 300 kilohertz, others may operate at 400 kilohertz, and other may operate at 500 kilohertz. However, even if the voltage regulators are designed to operate at the same frequency, because these voltage regulators operate using different clocks, the common operating frequency of the voltage regulators may deviate from one another when in operation.

In the case of the same frequency or different frequency, when a number of voltage regulators operate asynchronously, there may be periods of time where an input current requirement is relatively high. In one generic example, if one of the voltage regulators peeks at 1 amp, another voltage regulator peaks at 1 amp, and still another voltage regulator peeks at 1 amp, the computing device should be able to handle a total of three amps in case all three voltage regulators peek at the same time. However, in order to handle a relatively large amount of current, the computing device may require a relatively large number of capacitors.

In other words, the current requirement may control the amount of capacitance, e.g., the higher the current requirement, the higher the amount of capacitance required. For example, a capacitor is an electrically charged storage element. Normally, the computing device includes a relatively large number of capacitors on the motherboard. Some of these capacitors may be connected to a particular voltage regulator, and others may be connected to other voltage regulators. The capacitors may store energy, and when the voltage regulators fire asynchronously, the voltage regulators may pull energy out of the capacitors in order to provide the right amount of energy without the voltages of the various rails deceasing in a manner that was not intended. However, the conventional voltage regulator design may require a relatively large amount of capacitance in order to handle a relatively large amount of input current due to the nature of asynchronous operation of these voltage regulators.

SUMMARY

The details of one or more implementations are set forth in the accompanying drawings and the description below. Other features will be apparent from the description and drawings, and from the claims.

In some implementations, a computing device may include a plurality of voltage regulators including a first voltage regulator and a second voltage regulator, and a multi-phase oscillator, connected to the first voltage regulator and the second voltage regulator, configured to synchronize the first voltage regulator and the second voltage regulator.

In some implementations, the multi-phase oscillator may be configured to generate sync pulse signals for synchronizing the first voltage regulator and the second voltage regulator including a first sync pulse signal for driving the first voltage regulator and a second sync pulse signal for driving the second voltage regulator. The second sync pulse signal may be out of phase from the first sync pulse signal. The first sync pulse signal may include first pulses, and the second sync pulse signal may include second pulses, and at least one first pulse may at least partially overlap with at least one second pulse. The first sync pulse signal may include first pulses, and the second sync pulse signal may include second pulses, and the first pulses do not overlap with the second pulses. The computing device may further include a common input capacitance bank including a plurality of capacitors, where the first voltage regulator and the second voltage regulator may be connected to the common input capacitance bank. The computing device may further include a computer processing unit (CPU), and a graphics processor, where the CPU and the graphics processor are connected to the common input capacitance bank. A number of the plurality of capacitors may be less than a number of capacitors required by the computing device if the first voltage regulator and the second voltage regulator are operating asynchronously. Each of the first voltage regulator and the second voltage regulator may produce a different voltage level or range of voltage. The multi-phase oscillator may be configured to drive the first voltage regulator and the second voltage regulator at a same frequency.

In some implementations, a computing device for synchronizing a plurality of voltage regulators may include a plurality of voltage regulators including a first voltage regulator and a second voltage regulator, and a multi-phase oscillator, connected to the first voltage regulator and the second voltage regulator, configured to synchronize the plurality of voltage regulators. The multi-phase oscillator may be configured to generate sync pulse signals for synchronizing the plurality of voltage regulators including a first sync pulse signal for driving the first voltage regulator and a second sync pulse signal for driving the second voltage regulator. The computing device may also include a common input capacitance bank including a plurality of capacitors, where the first voltage regulator and the second voltage regulator are connected to the common input capacitance bank.

In some implementations, the second sync pulse signal may be out of phase from the first sync pulse signal. The first sync pulse signal may include first pulses, and the second sync pulse signal may include second pulses, and at least one first pulse may at least partially overlap with at least one second pulse. The first sync pulse signal may include first pulses, and the second sync pulse signal may include second pulses, and the first pulses do not overlap with the second pulses. The computing device may further include a computer processing unit (CPU), and a graphics processor, where the CPU and the graphics processor are connected to the common input capacitance bank. A number of the plurality of capacitors may be less than a number of capacitors required by the computing device if the first voltage regulator and the second voltage regulator are operating asynchronously.

In some implementations, a method for synchronizing a plurality of voltage regulators may include generating, by a multi-phase oscillator, a first sync pulse signal for controlling switching operation of a first voltage regulator of a plurality of voltage regulators, and generating, by the multi-phase oscillator, a second sync pulse signal for controlling switching operation of a second voltage regulator of the plurality of voltage regulators, where the second sync pulse signal is out of phase from the first sync pulse signal.

In some implementations, the first voltage regulator and the second voltage regulator may be connected to a same capacitance bank having a plurality of capacitors. The first sync pulse signal may include first pulses, and the second sync pulse signal may include second pulses, and the first pulses do not overlap with the second pulses. The first sync pulse signal and the second sync pulse signal may have a same frequency.

DETAILED DESCRIPTION

The embodiments provide a device and a method for synchronizing voltage regulators to avoid the voltage regulators from firing at the same time, thereby reducing the capacitor storage requirements on the computing device. For example, the device and method may synchronize voltage regulators to minimize input capacitors and physical space requirements. In a simplified, non-limiting example, the computing device may include three voltage regulators, where each voltage regulator may peek at 1 amp. The voltage regulator design of the embodiments may ensure that the voltage regulators are not driven at the same time (or substantially around the same time), which, as a result, the computing device may require capacitance sufficient to support 1 amp's worth of instantaneous current rather than 3 amp's worth of instantaneous current. Again, this is a simplified example, where the embodiments encompass the situation of minimizing overlap of input current under all (or most) operating circumstances.

According to the embodiments, the voltage regulators may be arranged in a firing sequence that minimizes the overlap of input current such that the overall input current requirement is reduced. In other words, the voltage regulators may be designed with optimal operating points such that the overall input current requirement is reduced. However, there are a few design challenges that make the determination of the optimal firing sequence relatively difficult. For example, the behavior of the voltage regulators may widely vary depending on the input voltage. For example, when a battery of the computing device is fully charged, the input voltage may be 8.4 volts. When the battery is discharged, the input voltage may be 6 volts. When the computing device is plugged into a power source, the input voltage may be 12 volts. Therefore, the device may be designed in such as manner that optimum synchronization and phasing is provided for all operating conditions of the computing device.

Further, depending on the loading characteristics of the voltage regulators, the voltage regulators may overlap between various phases. For example, voltage regulators may produce a range of pulses such as wide or narrow pulses. The voltage regulator design of the embodiments may synchronize the voltage regulators in a manner that the voltage regulators may have minimal overlap or no overlap. Further, the voltage design of the embodiments may provide the optimal points of operation such that the voltage regulators are synchronized so that they minimal overlap under all (or substantially all) operating conditions.

This voltage regulator design may lead to a substantial reduction on the amount of capacitors required in the computing device. Further, the reduction of capacitors on the computing device may save costs (since the costs of capacitors may be relatively high). In addition, the reduction of capacitors on the computing device may save space, which is relatively important due to market pressures for thinner and smaller computing devices. In one example, the voltage regulator design of the embodiments may reduce capacitance requirements up to 50%. These and other features are further discussed with respect to the figures.

Figure 1:
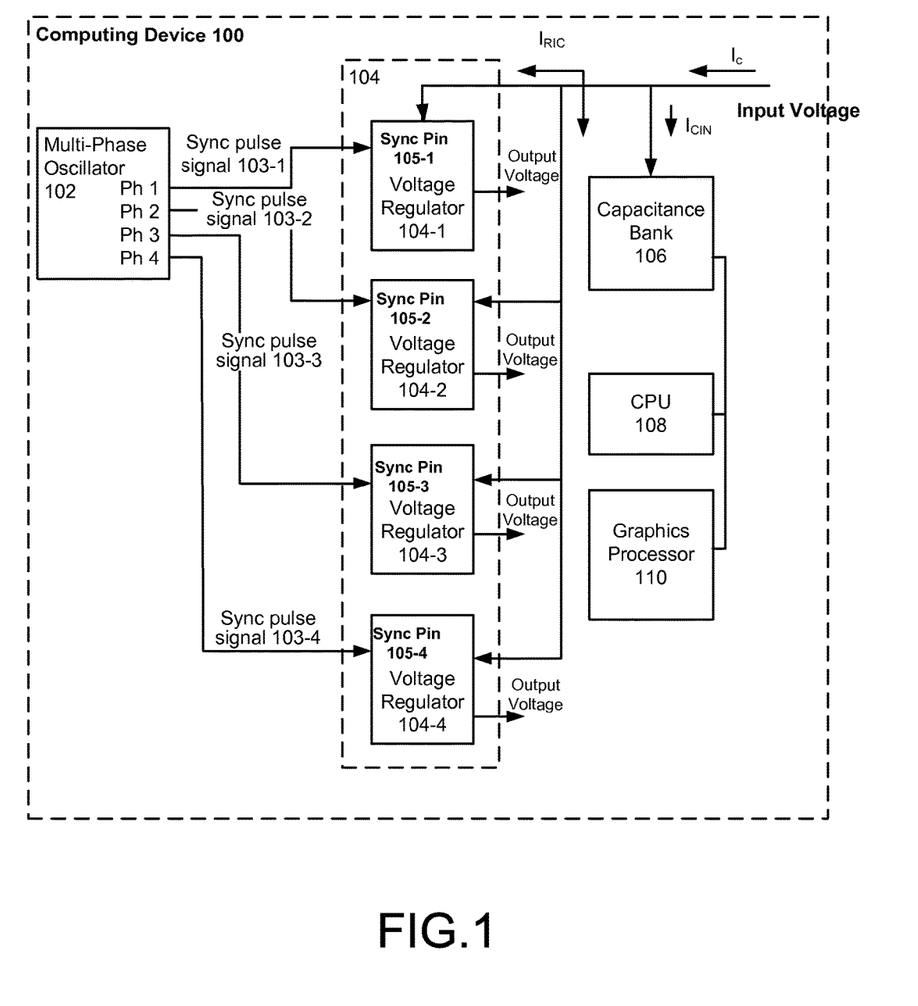
FIG. 1 illustrates a computing device having a plurality of voltage regulators and a multi-phase oscillator that synchronizes the plurality of voltage regulators according to an embodiment.

FIG. 1 illustrates a computing device 100 having a plurality of voltage regulators 104 and a multi-phase oscillator 102 configured to synchronize the plurality of voltage regulators 104 according to an embodiment. For example, the computing device 100 may synchronize the voltage regulators 104 to avoid the voltage regulators 104 from firing at the same time (or substantially around the same time), thereby reducing the capacitor storage requirements on the computing device. The computing device 100 may synchronize the voltage regulators 104 to minimize input capacitance and physical space requirements.

In one example, the computing device 100 may be a laptop or a desktop computer. In other examples, the computing device 100 may be a tablet, smartphone, or generally any computing device 100 utilizing multiple voltage regulators 104. Also, the computing device 100 may include a common capacitance bank 106, a computer processing unit (CPU) 108, and a graphics processor 110. Further, the computing device 100 may include other components known to one of ordinary skill in the art.

As shown in FIG. 1, each of the voltage regulators 104 may be connected to the common capacitance bank 106. However, in other embodiments, some of the voltage regulators 104 are connected to the common capacitance bank 106. Also, the CPU 108 and the graphics processor 110 may be connected to the common capacitance bank 106. The common capacitance bank 106 may include a plurality of capacitors (or generally referred to as capacitance). The common capacitance bank 106 may be configured to provide energy to the voltage regulators 104 in order to maintain their constant (or relatively constant) output voltages. In other words, the voltage regulators 104 may draw energy from the capacitance bank 106 in order to convert the input voltage to their respect output voltages and maintain these output voltages for use within various sub-systems of the computing device 100.

However, the synchronization of the voltage regulators 104 may minimization the current overlap during operation of the voltage regulators 104, thereby minimizing the amount of capacitance contained within the capacitance bank 106. For example, the input current $I_c$ may be based on the regulator input current $I_{RIC}$ and the capacitance input current $I_{CIN}$. As further explained below, the input current $I_c$ requirement may be reduced by reducing the current overlap of the voltage regulators 104 by synchronizing the voltage regulators 104 to fire out of phase (or substantially out of phase). Because the input current $I_c$ requirement is reduced, the number of capacitors contained in the common capacitance bank 106 is less than the number of capacitors required on the computing device 100 if the voltage regulators 104 are operating asynchronously.

The CPU 108 may be an electrical component configured to carryout the operations of the computing device 100. In this context, the computing device 100 may include one or more CPUs, and the CPU 108 represented in FIG. 1 may represent the main (or multiple) processing components contained on the computing device 100. The graphics processor 110 may be a specialized electronic component designed to process computer graphics. In some embodiments, the graphics processor 110 and the CPU 108 may be separate electrical components. In other embodiments, the graphics processor 110 and the CPU 108 may be embodied in a single electrical component.

Each voltage regulator 104 may be an electrical component designed to maintain a constant (or substantially constant) voltage output. For example, the computing device 100 may include various sub-systems that require different levels of constant power. The various sub-systems may include the CPU 108 and/or the graphics processor 110, as well as any other type of commonly known sub-system. For example, the various sub-systems may require different voltage levels (e.g., 3V, 5V, and 9V, etc.), and the voltage regulators 104 may receive the input voltage and provide the various voltages levels for powering the sub-systems. As such, generally, each voltage regulator 104 may be configured to convert the input voltage to a different voltage level. In one example, the voltage regulators 104 may be switching regulators that receive the input voltage and rapidly switch the input voltage on and off on a periodic cycle having an operating frequency, which, as a result, filters the input voltage into a different voltage level. As discussed below, the periodic cycle/operating frequency for each of the voltage regulators 104 may be determined by the clock signals (e.g., the sync pulse signals).

In the example of FIG. 1, the voltage regulators 104 may include a first voltage regulator 104-1, a second voltage regulator 104-2, a third regulator 104-3, and a fourth regulator 104-4. However, generally, the voltage regulators 104 may include any number of voltage regulators such as any number greater than or equal to two. In one example, the voltage regulators 104 may produce voltage outputs of 5V, 3.3V, 1.8, 12V, and/or generally any type of voltage level based on the input voltage and the sync pulse signals 103.

The multi-phase oscillator 102 may be configured to synchronize the plurality of voltage regulators 104 such that the voltage regulators 104 do not operate asynchronously. The multi-phase oscillator 102 may be any type of oscillator that generates out of phase signals or substantially out of phase signals for driving the voltage regulators 104. In this context, the multi-phase oscillator 102 may be associated with a plurality of phases. In the example of FIG. 1, the multi-phase oscillator 102 includes four phases—a first phase, a second phase, a third phase, and a fourth phase. However, the multi-phase oscillator 102 may include any number of phases such as any number greater or equal to two. In this context, it is understood that the four-phase oscillator 102 of FIG. 1 is merely example for explanatory purposes only. As further described below, each of these phases is associated with a different signal that is out of phase or substantially out of phase with one or more other signals.

Generally, an oscillator may be an electronic circuit that produces a repetitive, oscillating electronic signal, which may be a square wave having a number of pulses. Generally, a multi-phase oscillator may generate a plurality of output signals from a single input, where each output signal is phase-shifted by a certain amount. Conventionally, a multi-phase oscillator may be employed in a system having a single regulator (e.g., large power systems). In one simplified example, a multi-phase oscillator may convert a power level of 12-volts into a power level of 1-volt. In a conventional system, when the current load increases, the multi-phase oscillator may switch to multi-phase operation where the phases fire out of sequence for equalizing current in the system.

In contrast to the conventional approach, the multi-phase oscillator 102 is adapted and applied to the overall system, which includes a number of voltage regulators 104, such that the voltage regulators 104 are synchronized in a manner that the input capacitance requirements are minimized to save cost and space associated with the computing device 100. Further, the multi-phase oscillator 102 may synchronize the voltage regulators 104 according to a firing sequence that accounts for all (or substantially all) operating conditions of the computing device 100.

In one example, the operating conditions may relate the variations of input voltages during actual operation of the computing device 100 which may range from 6 volts to 12 volts, for example. If the computing device 100 is connected to an outside power source, the input voltage may provide a certain power level (e.g., 12 volts). If the battery associated with the computing device 100 is fully charged, the input voltage may provide a different power level (e.g., 8.4 volts). If the battery associated with the computing device 100 is discharged, the input voltage may provide a different power level (e.g., 6 volts).

As such, the design of the firing sequence takes into account the various kinds of input voltage that the computing device 100 may receive in manner that the current overlap is minimized. The design of the firing sequence relates to which particular voltage regulator 104 is driven during the first phase, which particular voltage regulator 104 is driven during the second phase, and so forth, under all (or most) operating conditions. Minimization of the current overlap may lead to a reduction in the amount of capacitance in the capacitance bank 106 which represents the overall capacitance in the computing device 100.

Irrespective of the power supplied to the voltage regulators 104, each voltage regulator 104 may provide a relatively constant output voltage based on, in part, the current pulled from the capacitance bank 106. Accordingly, when each of the voltage regulators 104 are driven according to their respective sync pulse signal(s) 103, the voltage regulators 104 may receive regulator input current $I_{RIC}$ to produce their respective constant output voltage based on the energy stored in the capacitance bank 106 and/or associated with the input current $I_c$.

According to the embodiments, the multi-phase oscillator 102 may generate a plurality of sync pulse signals 103 that control the firing sequence of the plurality of voltage regulators 104, where each sync pulse signal 103 is phase-shifted by a certain amount. In other words, a particular sync pulse signal 103 may be associated with phase offset or phase difference with respect to another sync pulse signal 103. For example, each sync pulse signal 103 may have the same frequency but have a different phase expressed in electrical degrees or time. In one example, each of the sync pulse signals 103 are out of phase from each other, e.g., each sync pulse signal 103 does not overlap with any other sync pulse signal 103 (e.g., see FIG. 2A). In another example, one or more of the sync pulse signals 103 at least partially overlap with one or more sync pulse signals 103 (e.g., see FIG. 2B). In one example, the sync pulse signals 103 are offset from each other by the same fixed amount. In other examples, the offsets between the sync pulse signals 103 vary. Also, the multi-phase oscillator 102 may generate any number of sync pulse signals 103 (e.g., 1 to 2, 1 to 4, or 1 to 8 output oscillator, etc.).

The multi-phase oscillator 102 may be connected (directly or indirectly) to each of the voltage regulators 104. As shown in FIG. 1, each of the first voltage regulator 104-1, the second voltage regulator 104-3, the third voltage regulator 104-3, and the fourth voltage regulator 104-4, may be connected to the multi-phase oscillator 102. In one example, each voltage regulator 104 may include a sync pin 105. For example, the first voltage regulator 104-1 may include a first sync pin 105-1, the second voltage regulator 104-2 may include a second sync pin 105-2, the third voltage regulator 104-3 may include a third sync pin 105-3, and the fourth voltage regulator 104-4 may include a fourth sync pin 105-4.

In one example, the first sync pin 105-1 of the first voltage regulator 104-1 may be connected to the pin or port of the multi-phase oscillator 102 associated with the first phase (Ph 1) via a connection line, the second sync pin 105-2 of the second voltage regulator 104-2 may be connected to the pin or port of the multi-phase oscillator 102 associated with the second phase (Ph 2) via a connection line, the third sync pin 105-3 of the third voltage regulator 104-3 may be connected to the pin or port of the multi-phase oscillator 102 associated with the third phase (Ph 3) via a connection line, and the fourth sync pin 105-4 of the fourth voltage regulator 104-4 may be connected to the pin or port of the multi-phase oscillator 102 associated with the fourth phase (Ph 4) via a connection line. In this example, each of the voltage regulators 104 may be driven by a different sync pulse signal 103 with a different phase.

However, it is noted that each voltage regulator 104 does not necessarily need be connected or otherwise associated with a different phase of the multi-phase oscillator 102. For example, two or more voltage regulators 104 may be connected to the same phase of the multi-phase oscillator 102. For example, the first voltage regulator 104-1 and the second voltage regulator 104-2 may be connected to the same phase, e.g., Ph 1. Alternatively, multiple phases may be associated with the same voltage regulator 104. For example, the first voltage regulator 104-1 may be connected to the first phase and the second phase of the multi-phase oscillator 102.

Therefore, the multi-phase oscillator 102 may be configured to drive the plurality of voltage regulators 104 at the same clock frequency with multiple phases. For example, the multi-phase oscillator 102 may be configured generate the sync pulse signals 103 to synchronize the voltage regulators 104 using the same clock frequency with multiple phases. In one example, the clock frequency may be 425 KHz. However, the embodiments encompass any type of clock frequency. The multi-phase oscillator 102 may be configured to generate a first sync signal 103-1 for controlling the first voltage regulator 104-1, a second sync signal 103-2 for controlling the second voltage regulator 104-2, a third sync signal 103-3 for controlling the third voltage regulator 104-3, and a fourth sync signal 103-4 for controlling the fourth voltage regulator 104-4. Also, as indicated above, there may not necessarily be a one-to-one correspondence between a sync pulse signal 103 and a voltage regulator 104. For example, a single sync pulse signal 103 may drive two or more voltage regulators 104.

In one embodiment, each sync pulse signal 103 may be out of phase from each other. For example, the second sync pulse signal 103-2 may be out of phase from the first sync pulse signal 103-1. In another embodiment, one or more sync pulse signals 103 may be partially out of phase from one or more other sync pulse signals 103. For example, the second sync pulse signal 103-2 may be partially out of phase with the first sync pulse signal 103-1, e.g., the pulses of the second sync pulse signal 103-1 may at least partially overlap with the pulses of the first sync pulse signal 103-1.

Figure 2A:
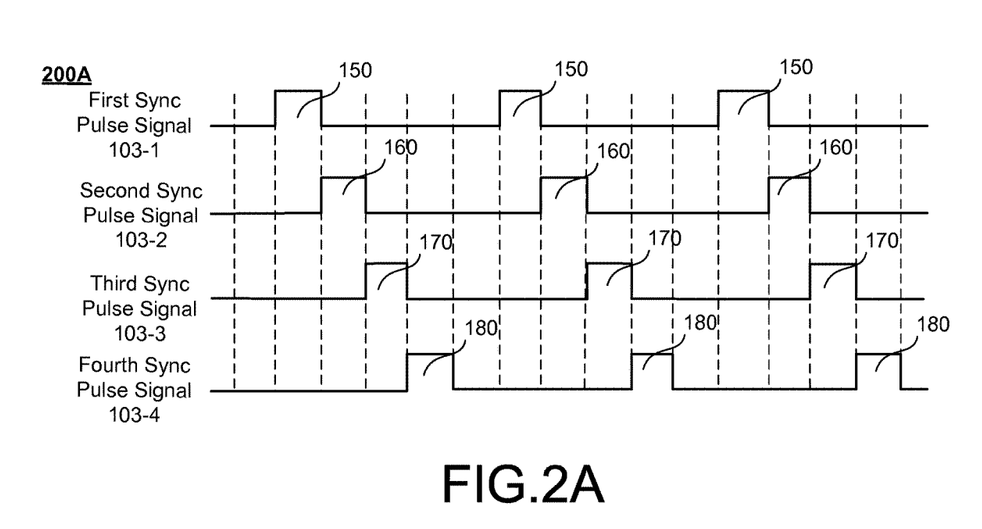
FIG. 2A illustrates a timing diagram for multi-phase operation of the multi-phase oscillator according to an embodiment.

FIG. 2A illustrates a timing diagram 200A for multi-phase operation of the multi-phase oscillator 102 according to an embodiment. The timing diagram 200A illustrates the various phases of the multi-phase oscillator 102 including the first sync pulse signal 103-1, the second sync pulse signal 103-2, the third sync pulse signal 103-3, and the fourth sync pulse signal 103-4. In the example of FIG. 2A, each of the sync pulse signals 103 are out of phase from each other.

For example, the first sync pulse signal 103-1 may include first pulses 150, the second sync pulse signal 103-2 may include second pulses 160, the third sync pulse signal 103-3 may include third pulses 170, and the fourth sync pulse signal 103-4 may include fourth pulses 180. As shown in FIG. 2A, the first pulses 150, the second pulses 160, the third pulses 170, and the fourth pulses 180 do not overlap.

Figure 2B:
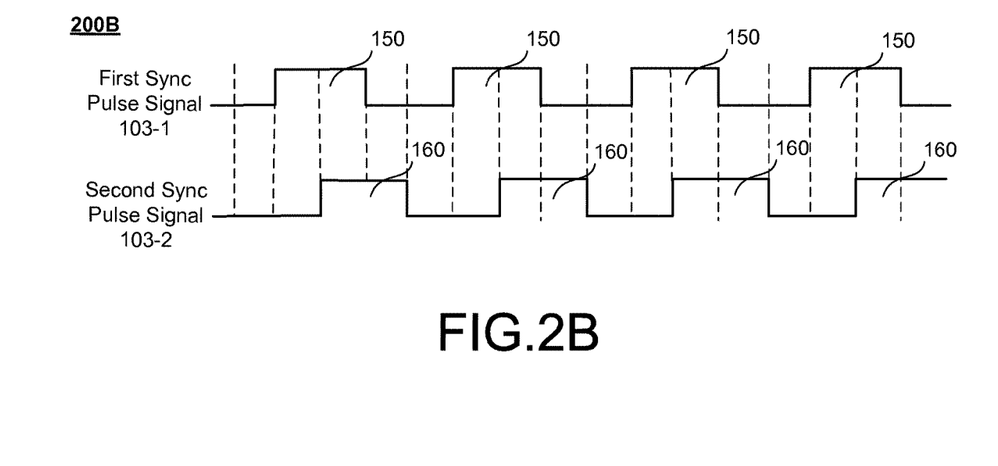
FIG. 2B illustrates a timing diagram for multi-phase operation of the multi-phase oscillator according to another embodiment.

FIG. 2B illustrates a timing diagram 200B for multi-phase operation of the multi-phase oscillator 102 according to another embodiment. In this example, at least some of the pulses overlap with the pulses of other pulses. For example, the second pulses 160 of the second sync pulse signal 103-2 may at least partially overlap with the first pulses 150 of the first sync pulse signal 103-1.

Figure 3:
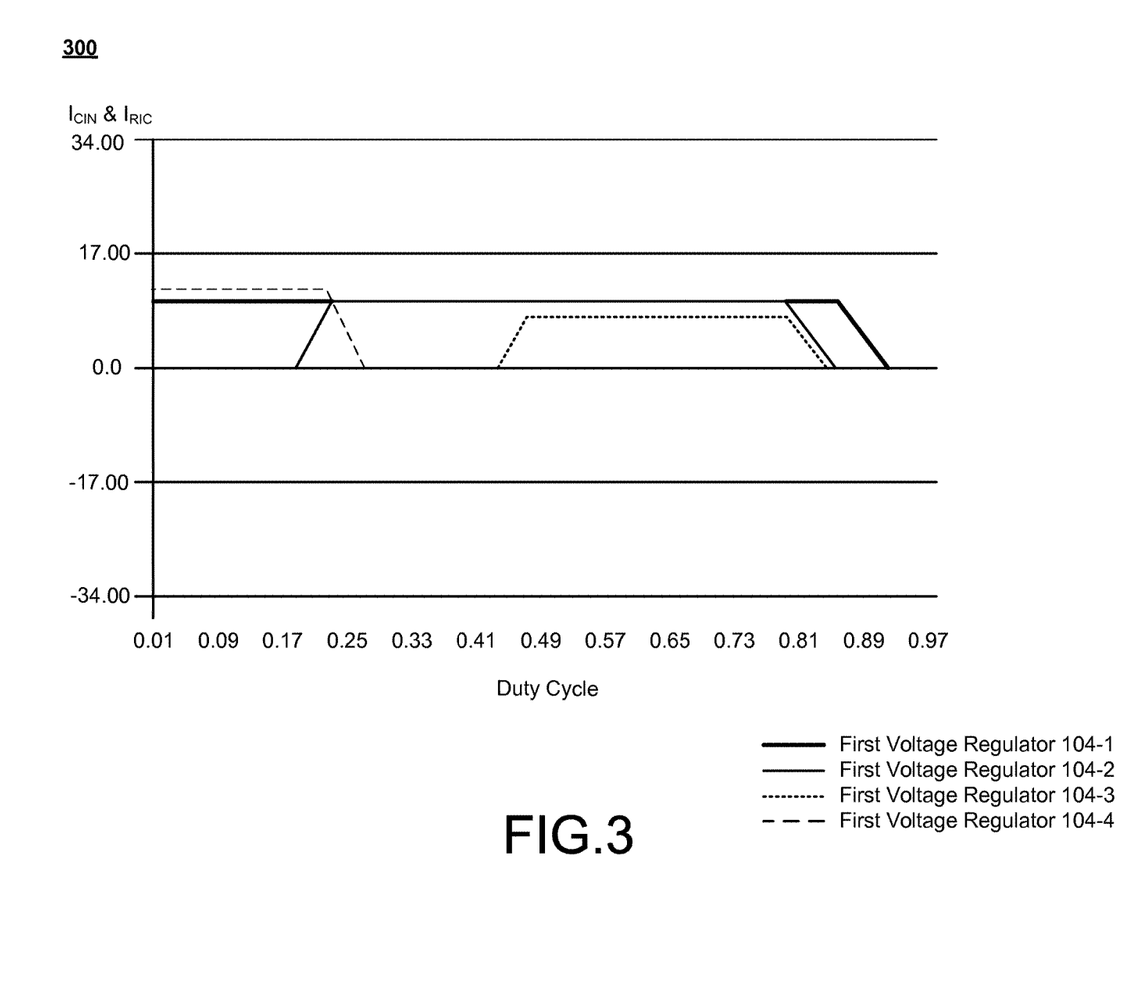
FIG. 3 illustrates a graph depicting current versus duty cycle of the computing device of FIG. 1 that minimizes current overlap according to an embodiment.

FIG. 3 illustrates a graph 300 depicting the current ($I_{CIN}$ & $I_{RIC}$) versus duty cycle of the computing device 100 of FIG. 1 that minimizes current overlap according to an embodiment. For example, the graph 300 depicts the regulator input current $I_{RIC}$ and the capacitance input current $I_{CIN}$ for the computing device 100. In other words, the graph 300 may depict the overall current capacity of the computing device 100. As shown in FIG. 3, using the design of FIG. 1, the overlap of current may be reduced. In particular, the graph 300 depicts the current ($I_{CIN}$ & $I_{RIC}$) for each of the voltage regulators 104 shown in FIG. 1. The firing sequence of the voltage regulators 104 may be designed to minimize the current overlap between voltage regulators 104.

Figure 4:
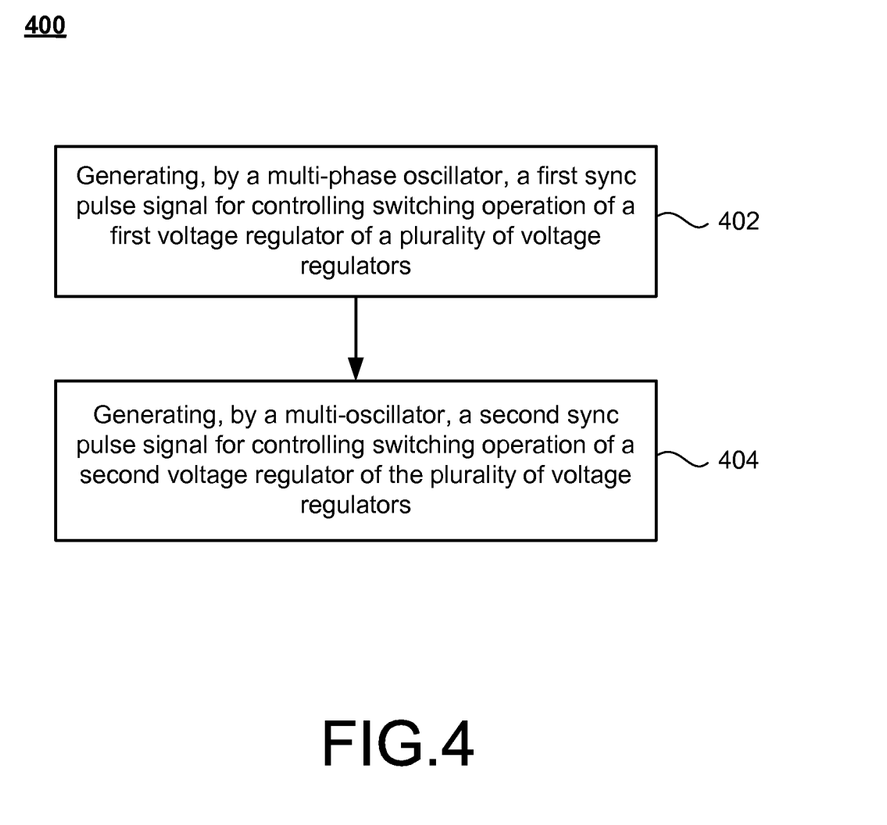
FIG. 4 illustrates example operations of the computing device of FIG. 1 according to an embodiment.

FIG. 4 illustrates a flowchart 400 depicting example operations of the computing device of FIG. 1 according to an embodiment.

A first sync pulse signal for controlling switching operation of a first voltage regulator of a plurality of voltage regulators may be generated by a multi-phase oscillator (402). For example, referring to FIG. 1, the multi-phase oscillator 102 may be configured to generate a first sync pulse signal 103-1 for driving (or firing) the first voltage regulator 104-1 during the first phase of the multi-phase oscillator 102. The first voltage regulator 104-1 may be one of a plurality of voltage regulators 104 that are each connected to the same capacitance bank 106. The first voltage regulator 104-1 may be connected to the multi-phase oscillator 102. For example, the first voltage regulator 104-1 may include the first sync pin 105-1, and the first sync pin 105-1 may be connected to the first phase port or pin of the multi-phase oscillator 102 via a connection line.

Based on the first sync pulse signal 103-1, the first voltage regulator 104-1 may convert a power level of the input voltage into a different power level. For example, the first voltage regulator 104-1 may repeatedly switch the input voltage such that the input voltage is filtered into a different power level. In this context, the first voltage regulator 104-1 may pull current (e.g., $I_{RJC}$ from the common capacitance bank 106 in order to maintain the level of output voltage supplied to one or more sub-systems of the computing device 100.

A second sync pulse signal for controlling switching operation of a second voltage regulator of the plurality of voltage regulators may be generated by the multi-phase oscillator (404).

For example, referring to FIG. 1, the multi-phase oscillator 102 may be configured to generate a second sync pulse signal 103-2 for driving (or firing) the second voltage regulator 104-2 during the second phase of the multi-phase oscillator 102. The second voltage regulator 104-2 may be one of a plurality of voltage regulators 104 that are each connected to the same capacitance bank 106. The second voltage regulator 104-2 may be connected to the multi-phase oscillator 102. For example, the second voltage regulator 104-2 may include the second sync pin 105-2, and the second sync pin 105-2 may be connected to the second phase port or pin of the multi-phase oscillator 102 via a connection line.

Based on the second sync pulse signal 103-2, the second voltage regulator 104-2 may convert a power level of the input voltage into a different power level. For example, the second voltage regulator 104-2 may repeatedly switch the input voltage such that the input voltage is filtered into a different power level. In this context, the second voltage regulator 104-2 may pull current (e.g., $I_{RJC}$ from the common capacitance bank 106 in order to maintain the level of output voltage supplied to one or more sub-systems of the computing device 100.

In one example, the second sync pulse signal 103-1 is out of phase from the first sync pulse signal 103-2. For example, referring to FIG. 2A, the first sync pulse signal 103-1 may include first pulses 150, and the second sync pulse signal 103-2 may include second pulses 160. As shown in FIG. 2A, the first pulses 150 and the second pulses 160 do not overlap. In other words, the first sync pulse signal 103-1 and the second sync pulse signal 103-2 may have the same frequency but have a different phase expressed in electrical degrees or time. In one example, each of these sync pulse signals 103 are out of phase from each other, e.g., each sync pulse signal 103 does not overlap with any other sync pulse signal 103 (e.g., see FIG. 2A).

In another example, one or more of the sync pulse signals 103 at least partially overlap with one or more sync pulse signals 103 (e.g., see FIG. 2B). For example, referring to FIG. 2B, the second pulses 160 of the second sync pulse signal 103-2 may at least partially overlap with the first pulses 150 of the first sync pulse signal 103-1.

As described above, the voltage regulators 104 may be arranged in a firing sequence that minimizes the overlap of input current such that the overall input current requirement is reduced. Further, in contrast to the conventional approach, the multi-phase oscillator 102 is adapted and applied to the overall system, which includes a number of voltage regulators 104, such that the voltage regulators 104 are synchronized in a manner that the input capacitance requirements are minimized to save cost and space associated with the computing device 100. Further, the multi-phase oscillator 102 may synchronize the voltage regulators 104 according to a firing sequence that accounts for all (or substantially all) operating conditions of the computing device 100.

What is claimed is:

1. A computing device, comprising:
a plurality of voltage regulators including a first voltage regulator and a second voltage regulator, the first voltage regulator configured to output voltage at a first voltage level, the second voltage regulator configured to output voltage at a second voltage level, the second voltage level being different from the first voltage level, wherein the voltage at the first voltage level and the voltage at the second voltage level are supplied to different sub-systems of the computing device;
a multi-phase oscillator, connected to the first voltage regulator and the second voltage regulator, configured to synchronize the first voltage regulator and the second voltage regulator; and
a common input capacitance bank including a plurality of capacitors, wherein the first voltage regulator and the second voltage regulator are connected to the common input capacitance bank, wherein a number of the plurality of capacitors is less than a number of capacitors required by the computing device if the first voltage regulator and the second voltage regulator are operating asynchronously.

2. The computing device of claim 1, wherein the multi-phase oscillator is configured to generate sync pulse signals for synchronizing the first voltage regulator and the second voltage regulator including a first sync pulse signal for driving the first voltage regulator and a second sync pulse signal for driving the second voltage regulator.

3. The computing device of claim 2, wherein the second sync pulse signal is out of phase from the first sync pulse signal.

4. The computing device of claim 2, wherein the first sync pulse signal includes first pulses, and the second sync pulse signal includes second pulses, and at least one first pulse at least partially overlaps with at least one second pulse.

5. The computing device of claim 2, wherein the first sync pulse signal includes first pulses, and the second sync pulse signal includes second pulses, and the first pulses do not overlap with the second pulses.

6. The computing device of claim 1, wherein the different sub-systems of the computing device include:
a computer processing unit (CPU); and
a graphics processor, wherein the CPU and the graphics processor are connected to the common input capacitance bank.

7. The computing device of claim 1, wherein the plurality of voltage regulators are arranged in a firing sequence that minimizes an overlap of input current, the input current being based on regulator input current inputted to each respective voltage regulator and capacitance input current inputted to the common input capacitance bank.

8. The computing device of claim 1, wherein the multi-phase oscillator is configured to drive the first voltage regulator and the second voltage regulator at a same frequency.

9. A computing device for synchronizing a plurality of voltage regulators, the computing device comprising:
   a plurality of voltage regulators including a first voltage regulator and a second voltage regulator, the first voltage regulator configured to output voltage at a first voltage level, the second voltage regulator configured to output voltage at a second voltage level, the second voltage level being different from the first voltage level, wherein the voltage at the first voltage level and the voltage at the second voltage level are supplied to different sub-systems of the computing device;
   a multi-phase oscillator, connected to the first voltage regulator and the second voltage regulator, configured to synchronize the plurality of voltage regulators, the multi-phase oscillator configured to generate sync pulse signals for synchronizing the plurality of voltage regulators including a first sync pulse signal for driving the first voltage regulator and a second sync pulse signal for driving the second voltage regulator; and
   a common input capacitance bank including a plurality of capacitors, wherein the first voltage regulator and the second voltage regulator are connected to the common input capacitance bank, the common input capacitance bank configured to provide energy to the plurality of voltage regulators such that each of the first voltage regulator and the second voltage regulator maintains a substantially constant output voltage,
   wherein a number of the plurality of capacitors is less than a number of capacitors required by the computing device if the first voltage regulator and the second voltage regulator are operating asynchronously.

10. The computing device of claim 9, wherein the second sync pulse signal is out of phase from the first sync pulse signal.

11. The computing device of claim 9, wherein the first sync pulse signal includes first pulses, and the second sync pulse signal includes second pulses, and at least one first pulse at least partially overlaps with at least one second pulse.

12. The computing device of claim 9, wherein the first sync pulse signal includes first pulses, and the second sync pulse signal includes second pulses, and the first pulses do not overlap with the second pulses.

13. The computing device of claim 9, further comprising:
   a computer processing unit (CPU) configured to receive the voltage at the first voltage level; and
   a graphics processor configured to receive the voltage at the second voltage level, wherein the CPU and the graphics processor are connected to the common input capacitance bank.

14. A method for synchronizing a plurality of voltage regulators of a computing device, the method comprising:
   synchronizing, by a multi-phase oscillator, a plurality of voltage regulators including a first voltage regulator and a second voltage regulator, the first voltage regulator outputting voltage at a first voltage level, the second voltage regulator outputting voltage at a second voltage level, the second voltage level being different from the first voltage level, wherein the voltage at the first voltage level and the voltage at the second voltage level are supplied to different sub-systems of the computing device, the synchronizing including:
      generating, by the multi-phase oscillator, a first sync pulse signal for controlling switching operation of the first voltage regulator;
      generating, by the multi-phase oscillator, a second sync pulse signal for controlling switching operation of the second voltage regulator, wherein the second sync pulse signal is out of phase from the first sync pulse signal,
   wherein the first voltage regulator and the second voltage regulator are connected to a common capacitance bank having a plurality of capacitors, wherein a number of the plurality of capacitors is less than a number of capacitors required by the computing device if the first voltage regulator and the second voltage regulator are operating asynchronously.

15. The method of claim 14, wherein the first sync pulse signal includes first pulses, and the second sync pulse signal includes second pulses, and the first pulses do not overlap with the second pulses.

16. The method of claim 14, wherein the first sync pulse signal and the second sync pulse signal have a same frequency.

17. The computing device of claim 1, wherein the common input capacitance bank is configured to provide energy to the plurality of voltage regulators such that each of the first voltage regulator and the second voltage regulator maintains a substantially constant output voltage.

18. The computing device of claim 9, wherein, regardless of a level of power supplied to each of the plurality of voltage regulators, each of the plurality of voltage regulators is configured to supply a constant output voltage based on, in part, current pulled from the common input capacitance bank.

19. The method of claim 14, wherein the different sub-systems include a computer processing unit (CPU) and a graphics processing unit (GPU), the CPU receiving the voltage at the first voltage level, and the GPU receiving the voltage at the second voltage level.

* * * * *